United States Patent [19]

Iida et al.

[11] 4,378,777
[45] Apr. 5, 1983

[54] INTERNAL COMBUSTION ENGINE HAVING EXHAUST GAS RECIRCULATION SYSTEM

[75] Inventors: Katsuyoshi Iida; Yoshikuni Yada; Kathumi Okazaki, all of Hiroshima, Japan

[73] Assignee: Toyo Kogyo Co., Ltd., Hiroshima, Japan

[21] Appl. No.: 296,539

[22] Filed: Aug. 26, 1981

[30] Foreign Application Priority Data

Aug. 27, 1980 [JP] Japan .................................. 55-118767

[51] Int. Cl.³ .............................................. F02M 25/06
[52] U.S. Cl. ...................................... 123/571; 123/568
[58] Field of Search ................................. 123/571, 568

[56] References Cited

U.S. PATENT DOCUMENTS

| | | | |
|---|---|---|---|
| 3,915,134 | 10/1975 | Young et al. | 123/571 |
| 3,969,614 | 7/1976 | Moyer et al. | 123/571 |
| 4,123,729 | 10/1978 | Buetemeister | 123/571 X |
| 4,164,032 | 8/1979 | Nohira et al. | 123/571 X |
| 4,170,973 | 10/1979 | Nohira et al. | 123/571 |
| 4,280,471 | 7/1981 | Masaki | 123/571 |
| 4,318,385 | 3/1982 | Yamaguchi | 123/571 |

FOREIGN PATENT DOCUMENTS 50-32327 3/1975 Japan .
54-38437 8/1977 Japan .

*Primary Examiner*—Wendell E. Burns
*Attorney, Agent, or Firm*—Fleit, Jacobson & Cohn

[57] ABSTRACT

An internal combustion engine has an exhaust gas recirculation system including a recirculation valve for controlling the amount of exhaust gas returned to the intake system. The position or opening of the valve is controlled to a desired position in accordance with a memory in a memory device storing desired valve positions under various combinations of the engine load and the engine speed. A device is provided for increasing the opening of the recirculation valve when the effective area of the recirculation passage is decreased due to carbon deposits.

3 Claims, 4 Drawing Figures

INTERNAL COMBUSTION ENGINE HAVING EXHAUST GAS RECIRCULATION SYSTEM

The present invention relates to exhaust gas recirculation means for internal combustion engines and more particularly to recirculation valve control means for such exhaust gas recirculation means.

Conventionally, internal combustion engines have exhaust gas recirculation means for returning a part of exhaust gas in the exhaust system to the intake system so that the concentration of nitrogen oxides can be decreased in the exhaust gas. For the purpose, the engine is provided with an exhaust gas recirculation passage having a recirculation valve for controlling the amount of recirculated exhaust gas. In view of the fact that the recirculation of the exhaust gas to the intake system has an adverse effect on the drivability and the fuel economy of the engine, it is desirable to control the amount of recirculation gas to the minimum desired value. For the purpose, in Japanese patent application No. 52-103953 filed on Aug. 30, 1977 and disclosed on Mar. 23, 1979 for public inspection under the disclosure number of No. 54-38437, there is proposed to provide an electronical system for controlling the recirculation valve. According to the proposal, there is provided a memory device which stores the desired values of pressure for actuating the recirculation valve under various combinations of two parameters among the engine speed, the intake air flow and the intake air pressure. The system further includes control means which addresses the memorized value in accordance with the measured values of the two parameters of the engine operation and compare the addressed value with the measured value of the valve operating pressure to thereby control the valve operating pressure so that it conforms with the desired pressure under the operating condition.

It should however be noted that, in the exhaust gas recirculation system, there are possibilities that carbon particles be deposited on the wall of the recirculation passage through a prolonged time of use, causing a decrease in the cross-sectional area of the passage. Thus, the amount of recirculated exhaust gas will be correspondingly decreased even when the recirculation valve is maintained to a desired position. It will therefore be understood that the effect of decreasing nitrogen oxides in the exhaust gas be weakened through a prolonged time of use. Further, it will be disadvantageous from the economical standpoint to replace the conduits for the recirculation passage and the recirculation valve only for the carbon deposits.

It is therefore an object of the present invention to provide exhaust gas recirculation means in which means is provided for compensating for the decrease in the amount of recirculation gas due to the carbon deposite in the recirculation passage.

Another object of the present invention is to provide electronically controlled exhaust gas recirculation means in which exact metering of recirculated gas can be maintained even after a prolonged time of use.

According to the present invention, the above and other objects can be accomplished by an internal combustion engine comprising an exhaust system for passing exhaust gas from combustion chamber means, an intake system leading to said combustion chamber means to provide a supply of intake gas thereto, an exhaust gas recirculation system having exhaust gas recirculation passage means for returning a certain amount of exhaust gas to said intake system, recirculation valve means provided in said recirculation passage means, said recirculation valve means including valve member means of which position can be changed to vary the amount of exhaust gas which is to be returned to the intake system, engine load sensing means for detecting engine load and producing an engine load signal, engine speed sensing means for detecting engine speed and producing an engine speed signal, valve member position sensing means for detecting the position of the valve member means in the circulation valve means, first memory means storing memories of desired positions of the valve member means under various combinations of values of the engine load and the engine speed, control means for controlling the circulation valve means in accordance with the load and engine speed signals so that the actual position of the valve member means conforms with the desired position under the detected engine load and speed, second memory means storing memories of desired values of intake gas flow under various combinations of values of the engine load and engine speed, intake flow sensing means for detecting actual intake gas flow and producing an intake flow signal, said control means further including means for controlling the circulation valve means so that the valve member means is moved beyond the desired position when the actual intake gas flow is greater than the desired value so as to compensate for a decrease in the recirculated exhaust gas.

Under a specific engine load and engine speed, the intake gas flow is expected to take a predetermined value as far as a suitable amount of exhaust gas is recirculated. When the amount of the recirculated gas is decreased due to the carbon deposition in the recirculation passage, there will be a corresponding increase in the intake gas flow. According to the present invention, such increase in the intake gas flow is detected and the valve opening is then increased to thereby increase the recirculated gas flow.

The above and other objects and features of the present invention will become apparent from the following descriptions of a preferred embodiment taking reference to the accompanying drawings, in which.

Figure 1:
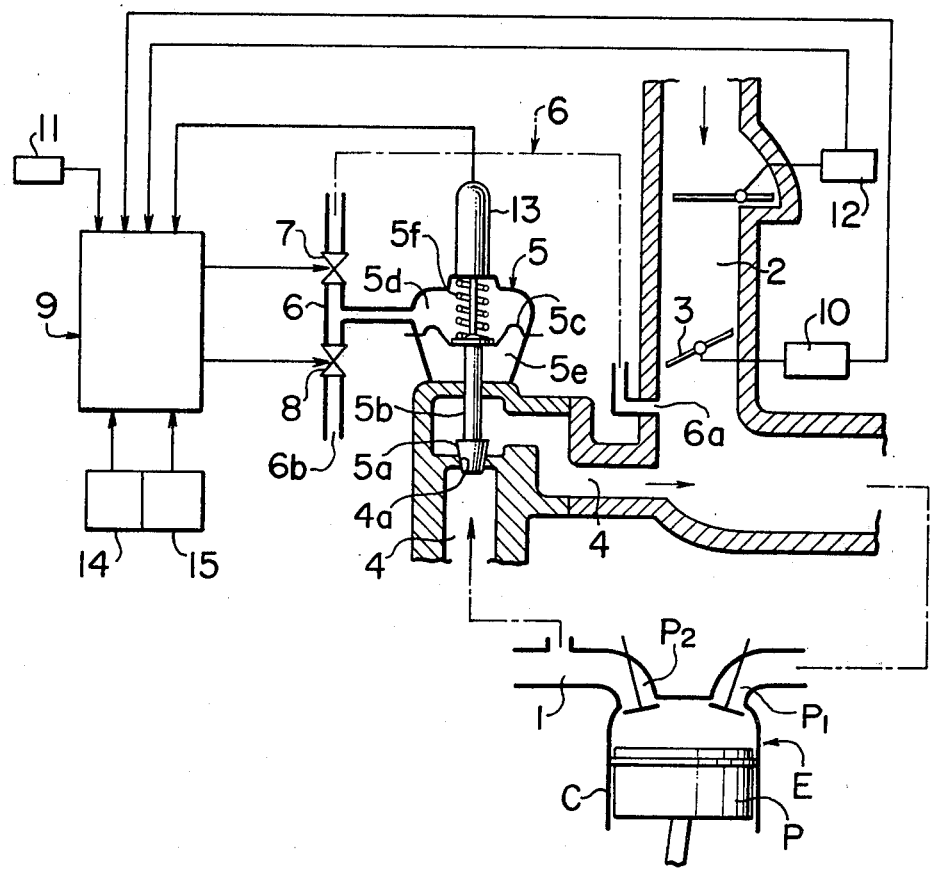
FIG. 1 is a diagrammatical illustration of an exhaust gas recirculation system for an internal combustion engine in accordance with one embodiment of the present invention.

Referring now to the drawings, particularly to FIG. 1 there is shown an engine E including a cylinder C and a piston P. The cylinder C is formed with an intake port P1 communicating with an intake passage 2 and an exhaust port P2 leading to an exhaust passage 1. In the intake passage 2, there is provided a throttle valve 3 for controlling the flow of intake air. An exhaust gas recirculation passage 4 is branched from the exhaust passage 1 and opened to the intake passage 2 downstream of the throttle valve 3. In the recirculation passage 4, there is provided a recirculation valve 5 which includes a valve member 5a for cooperating with a valve port 4a formed in the passage 4. The valve member 5a is integrally formed with a valve stem 5b which extends outwardly from the passage 4 and is connected with a diaphragm 5c of a valve actuator. The diaphragm 5c divides the inside of the valve actuator casing into a suction pressure chamber 5d and an atmospheric pressure chamber 5e. A spring 5f is provided in the suction pressure chamber 5d so as to force the diaphragm 5c and therefore the valve stem 5b into a position wherein the valve member 5a closes the valve port 4a. When the chamber 5d is applied with a suction pressure, the diaphragm 5c and the valve stem 5b is moved against the influence of the spring 5f to thereby open the valve port 4a.

The suction pressure chamber 5d is connected with a suction pressure passage 6 which opens at one end 6a to the intake passage 2 downstream of the throttle valve 3 and at the other end 6b to the atmosphere. In the suction pressure passage 6, there are disposed a suction pressure solenoid valve 7 and an atmospheric pressure solenoid valve 8 and the chamber 5d is connected with the passage 6 between the valves 7 and 8. In order to control the valves 7 and 8, there is provided a control device 9 which produces control signals to appropriately actuate the valves 7 and 8 so that a desired pressure is maintained in the suction pressure chamber 5d.

In the intake passage 2, there is provided a load sensor 10 which detects the engine load in terms of the opening of the throttle valve 3. Alternatively, the load sensor may be a pressure sensor for detecting the intake suction pressure. Further, the engine E is provided with a speed sensor 11 which detects the engine speed. In the intake passage 2, there is further provided an intake flowmeter 12 which detects the intake flow upstream of the throttle valve 3. The recirculation valve 5 is provided with a valve member position sensor 13 which detects the position of the valve stem 5b and therefore the valve member 5a. The signals from the sensors 10, 11, 12 and 13 are applied to the control device 9.

Figure 2:
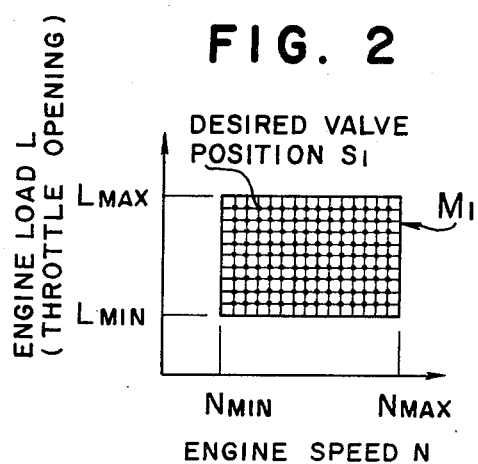
FIG. 2 is a diagrammatical illustration of a memorized map in the first memory device.
Figure 3:
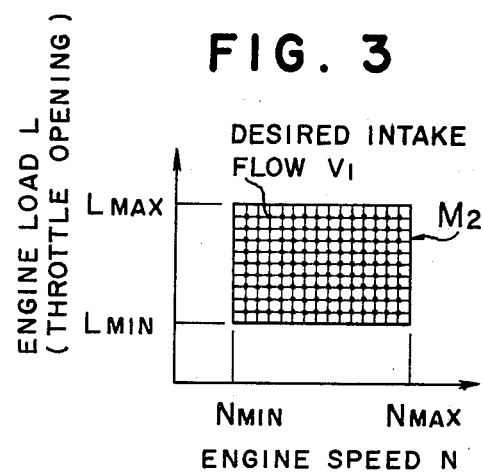
FIG. 3 is a diagrammatical illustration of a memorized map in the second memory device.
Figure 4:
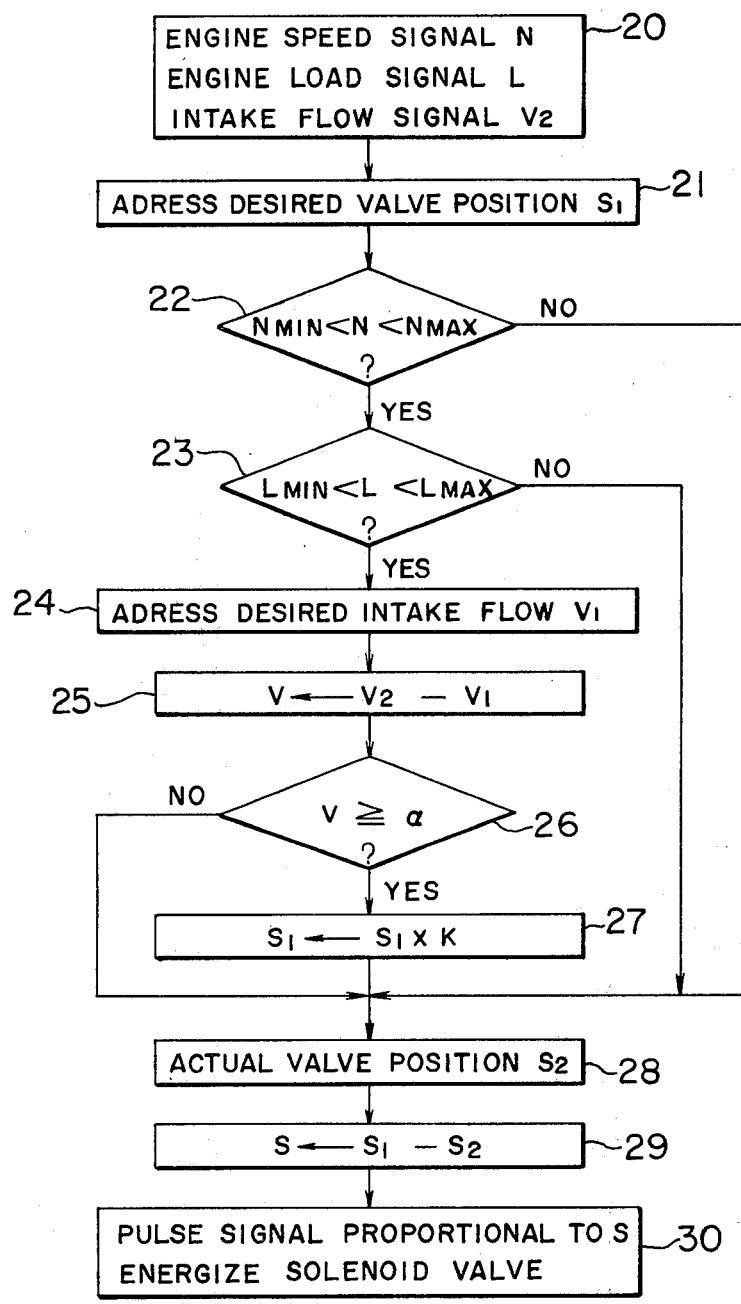
FIG. 4 is a flow chart showing the operation of the control device.

Further, the control device 9 is associated with a first and second memory devices 14 and 15. The first memory device 14 has a memory which may be in the form of a map $M_1$ as shown in FIG. 2 storing the informations on desired positions of the valve member 5a in the recirculation valve 5 under various combinations of the engine load and the engine speed. The desired positions of the valve member 5a may be determined through experiments. The second memory device 15 has a memory which may be in the form of a map $M_2$ as shown in FIG. 3 storing the informations on desired values of the intake flow under various combinations of the engine load and the engine speed. The control device 9 may be comprised of a known microprocessor.

Referring now to FIG. 3, when the engine E is started, the microprocessor addresses the stored memory $S_1$ in the map $M_1$ in predetermined intervals in accordance with the load and speed signals from the sensors 10 and 11 as shown in steps 20 and 21. Further, the microprocessor addresses the stored memory $V_1$ in the map $M_2$ in accordance with the load and speed signals from the sensors 10 and 11 as shown in steps 20 and 24. The speed signal N is then judged whether it is within the range between $N_{min}$ and $N_{max}$ wherein the recirculation of the exhaust gas is to be made. Similarly, the load signal L is judged whether it is within the range between $L_{min}$ and $L_{max}$ wherein the recirculation of the exhaust gas is to be made. Where one or both of the signals N and L are out of the respective ranges, signal are produced to close the solenoid valve 7 and open the solenoid valve 8 to thereby move the valve member 5a to the closed position in accordance with the memory in the map $M_1$. Where both of the signals N and L are within the respective range, the addressed memory $V_1$ is compared as shown in step 25 with the intake flow signal $V_2$ from the sensor 12. The difference between the addressed value $V_1$ and the signal $V_2$ from the sensor 12 is then compared with a predetermined value $\alpha$ as shown by step 26 and if the difference is smaller than the value $\alpha$ it is judged that no modification is required. Then, the addressed memory $S_1$ is compared as shown in steps 28 and 29 with the valve position signal $S_2$ from the sensor 13 and the control device 9 produces pulse signals to energize the solenoid valves 7 and 8 appropriately so that a desired suction pressure is established in the chamber 5d so as to make the actual valve position conform with the desired valve position. Where the value $V_2$ is greater than the valve $V_1$ and the difference therebetween is greater than the value $\alpha$, the desired value $S_1$ is modified as shown in step 27 by being multiplied by a constant K which is larger than one. The modified value $S_1$ is then compared with the actual valve position signal $S_2$ as shown in step 29 to control the position of the valve member 5a. Thus, the valve member 5a is moved beyond the desired position to increase the opening of the valve port 4a to thereby increase the flow of the recirculated gas. It is therefore possible to compensate for a decrease in the recirculated gas flow due to carbon deposits in the recirculation passage.

The invention has thus been shown and described with reference to a specific embodiment, however, it should be noted that the invention is in no way limited to the details of the illustrated structures but changes and modifications may be made without departing from the scope of the appended claims.

We claim:

1. An internal combustion engine comprising an exhaust system for passing exhaust gas from combustion chamber means, an intake system leading to said combustion chamber means to provide a supply of intake gas thereto, an exhaust gas recirculation system having exhaust gas recirculation passage means for returning a certain amount of exhaust gas to said intake system, recirculation valve means provided in said recirculation passage means, said recirculation valve means including valve member means of which position can be changed to vary the amount of exhaust gas which is to be returned to the intake system, engine load sensing means for detecting engine load and producing an engine load signal, engine speed sensing means for detecting engine speed and producing an engine speed signal, valve member position sensing means for detecting the position of the valve member means in the circulation valve means, first memory means storing memories of desired positions of the valve member means under various combinations of values of the engine load and the engine speed, control means for controlling the circulation valve means in accordance with the load and engine speed signals so that the actual position of the valve member means conforms with the desired position under the detected engine load and speed, second memory means storing memories of desired values of intake gas flow under various combinations of values of the engine load and engine speed, intake flow sensing means for detecting actual intake gas flow and producing an intake flow signal, said control means further including means for controlling the circulation valve means so that the valve member means is moved beyond the desired position when the actual intake gas flow is greater than the desired value so as to compensate for a decrease in the recirculated exhaust gas.

2. An engine in accordance with claim 1 in which said control means is a microprocessor.

3. An engine in accordance with claim 1 in which the intake system includes intake passage means provided with throttle valve means, said intake flow sensing means being located in said intake passage means upstream of the throttle valve means.

* * * * *